Dec. 22, 1936.　　　　E. M. MAY　　　　2,065,086
VALVE
Filed May 24, 1933
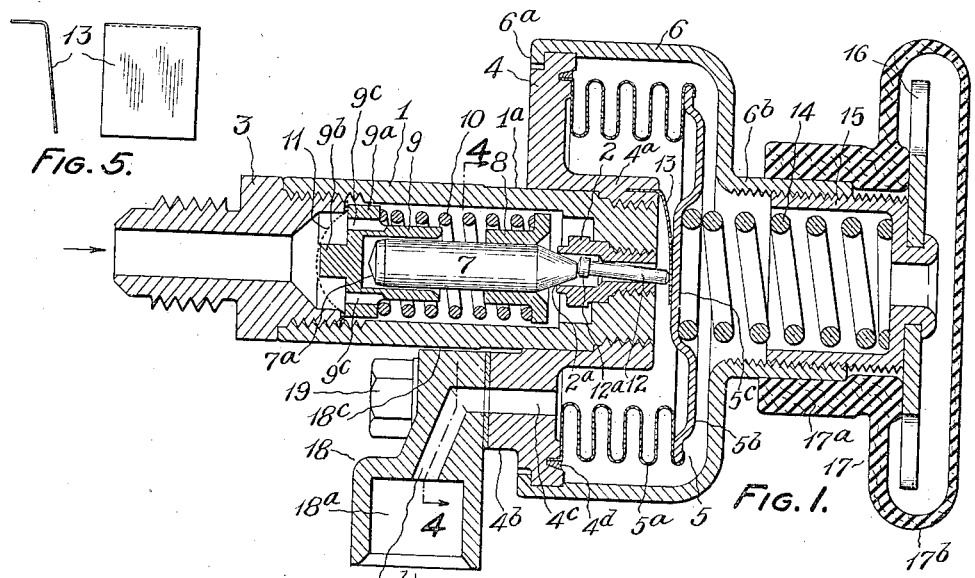
FIG. 5.
FIG. 1.
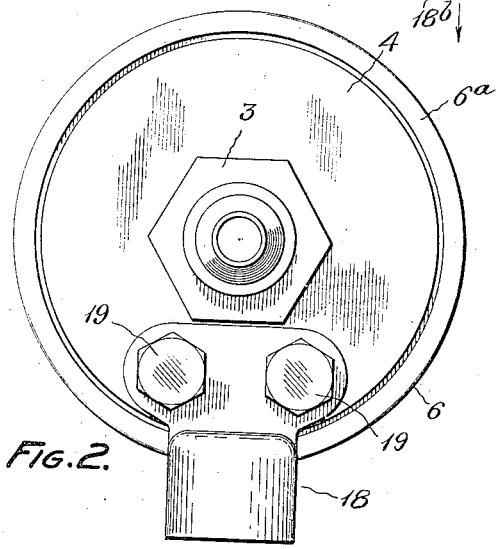
FIG. 2.
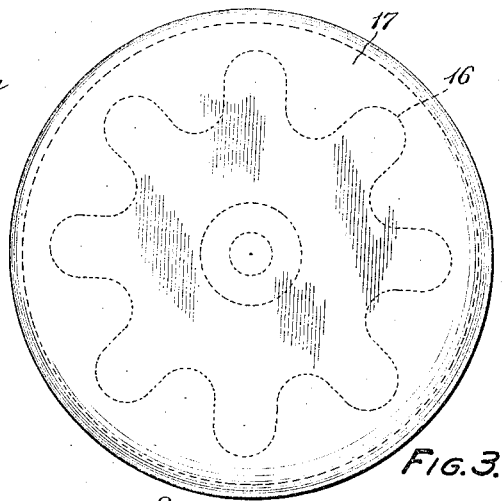
FIG. 3.
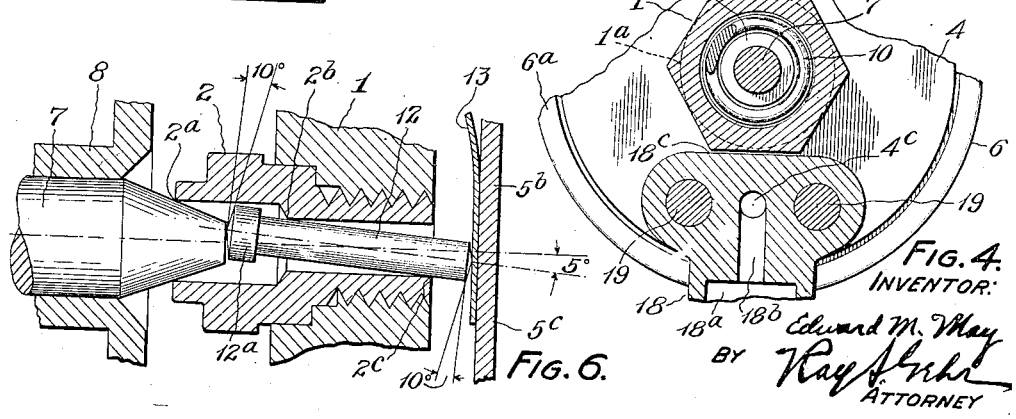
FIG. 6.
FIG. 4.
INVENTOR:
Edward M. May
BY
ATTORNEY Patented Dec. 22, 1936

2,065,086

UNITED STATES PATENT OFFICE 2,065,086

VALVE

Edward M. May, Detroit, Mich.

Application May 24, 1933, Serial No. 672,547

2 Claims. (Cl. 50—23)

The invention relates to improvements in valves, such for example as expansion valves, in which the valve proper is actuated, in part at least, by a movable diaphragm and it relates particularly to improvements in the casing structures of such valves.

The chief object of the invention is the provision of a valve of the diaphragm type which is effectively sealed against access of moisture to the diaphragm mechanism and which can be manually adjusted with great ease.

Other objects of the invention more or less ancillary or incidental to that above noted will be apparent from the following description having reference to the accompanying drawing.

In the drawing, Fig. 1 is a longitudinal sectional view through the axis of an expansion valve embodying my improvements.

Fig. 2 is a left end view of the valve shown in Fig. 1.

Fig. 3 is a right end view of the same valve.

Fig. 4 is a fragmentary section on the line 4—4 of Fig 1.

Fig. 5 shows edge and face views of one of the parts of the valve mechanism.

Fig. 6 is a fragmentary sectional view of the valve, valve seat and valve guide devices, the parts being shown on an enlarged scale for greater clearness.

Referring in detail to the constructions illustrated, the casing structure of the valve comprises an inlet chamber unit and an outlet chamber unit. The inlet chamber unit consists of an elongated part 1, a valve seat member 2 and a pipe connection 3. The part 1 is hexagonal exteriorly (Fig. 2) except at 1ª where it is turned down to cylindrical form. The part 1 can conveniently be formed from hexagonal bar stock, as can also the valve seat member 2 and the pipe connection 3. The passage of the connection 3 constitutes the inlet to the inlet chamber unit of the casing while the passage of the valve seat member 2 constitutes the outlet therefrom.

The outlet chamber unit of the casing structure comprises a circular disc-like body 4 formed on one side with an internally threaded boss 4ª in which the externally threaded end of the inlet chamber 1 is detachably secured, the cylindrical portion 1ª of the part 1 fitting the aperture in the member 4. On its outer side member 4 is formed with a boss 4ᵇ through which extends an outlet passage 4ᶜ. 5 designates as an entirety a movable diaphragm of the bellows type comprising a metallic bellows part 5ª and a relatively rigid plate or disc 5ᵇ which is hermetically connected to and closes one end of the bellows. The other end of the bellows is hermetically secured by solder or the like 4ᵈ in a groove formed in the face of the member 4. A cup-like casing part 6, which can conveniently be drawn from sheet metal, has its larger end rigidly secured to the outer periphery of the member 4, this being accomplished in the construction shown by spinning the edge 6ª of the part 6 around the edge of the member 4. The casing part 6 is formed with an internally threaded boss 6ᵇ, the purpose of which will be referred to later.

In the inlet chamber unit of the casing is disposed a valve 7 of the needle type. This valve may appropriately be of the composite construction disclosed in my United States Letters Patent No. 1,964,687, the shank of the valve being formed preferably of stainless steel while the conical end or tip is formed of a hard alloy, such as Stellite. The valve member 7, adjacent to its conical end, carries a flanged sleeve 8 which is rigidly secured to the valve by a forced fit therewith. The other end of the valve 7 has a loose sliding fit in the socket of guide 9 which is formed with a flange 9ª that abuts against the inner end of the connection 3. The flange 9ª thus affords a fixed abutment for one end of a coiled spring 10, the other end of which engages the flange of the sleeve 8 so that the spring serves to press the valve 7 toward the seat member 2. A screen 11 is preferably interposed between the end of the connection 3 and the guide member 9 and to prevent crushing in of the screen when the parts are assembled, the guide 9, as hereinafter explained, is formed with a lug or boss 9ᵇ to support the central part of the screen. The guide 9 is formed with a plurality of passages 9ᶜ to insure free passage of fluid past the guide.

In the passage through the valve seat member 2 is disposed a thrust pin 12 with one end engaging the flat truncated end of the valve 7 and its other end engaging a buffer vane 13 which in turn is engaged by the central part of the diaphragm plate 5ᶜ. The vane 13, which may appropriately be a thin sheet of hard bronze, is secured at one end to the boss 4ª, having its other end free to flex and move with the movement of the diaphragm. The vane 13 can be secured to the boss 4ª in any suitable manner but as shown the boss is slotted to receive the short arm of the vane and the metal of the boss is then upset to tightly clamp the vane. By suitably forming the vane 13 of elastic material its free end can be made to press resiliently against the adjacent end of the thrust pin 12. The vane is preferably given the free form shown in Fig. 5.

A strong coiled spring 14 has one end arranged to press against the plate 5c of the bellows diaphragm while its other end has an abutment against a flanged sleeve 15 which threadedly engages the internally threaded boss 6b of the casing part 6. A serrated hand wheel 16 is rigidly secured to the sleeve 15 and by manually turning this wheel the pressure of the spring 14 against the diaphragm can be varied.

To prevent access of moisture to the interior of the casing part 6, a rubber cap 17 is provided which has a relatively thick and stiff cylindrical part 17a which fits over the cylindrical boss 6b, while the thinner, softer and more flexible part 17b of the cap encompasses the hand wheel 16. The thinner part 17b of the rubber cap is sufficiently soft and flexible to be collapsed against the serrated edge of the hand wheel 16 so that the latter can be turned without removing the rubber cap. The operator can accomplish this by causing the entire rubber cap to turn with the hand wheel in a continuous movement, the heavy tubular part 17a of the rubber cap sliding on the smooth cylindrical surface of the boss 6b of the casing, or, by giving the hand wheel 16 a series of short turns, the operator releasing his grasp on the rubber cap and hand wheel at the end of each short turn so that the desired amount of rotation can be accomplished without turning the rubber cap on the casing and without undue distortion of the cap. By means of the improved construction I obviate the necessity of removing the rubber cap when the tension of the spring 14 is adjusted.

The outlet unit of the casing is provided with a discharge connection 18 which is secured to the flat face of the outlet boss 4b of member 4 by means of machine screws 19. This connection is formed with a socket 18a, which can be sweated on the end of a tube or pipe, and has a passage 18b arranged to communicate with the discharge passage 4c of the casing member 4. The connection 18 is formed at one end with a flat face 18c arranged to lie closely adjacent a face of the hexagonal surface of the casing member 1 when the latter is screwed home in the casing member 4 (Figs. 1 and 4). The member 1 is thus effectively locked against displacement in relation to the member 4.

In a typical use of the expansion valve described above, its connection 3 is connected with the high pressure side of a refrigerating system and the connection 18 to the low pressure side thereof. In the operation of the valve as thus connected, when the pressure in the low pressure side of the system falls to a certain point, which is determined by the tension of the spring 14, the pressure of said spring against the diaphragm plate 5c, transmitted through the thrust pin 12 to the valve 7, becomes great enough to overcome the tension of spring 10 so that the valve is lifted off its seat and liquid refrigerant from the high pressure side of the system is allowed to pass. When the pressure in the low pressure side of the system again rises the large spring 14 is sufficiently compressed by the diaphragm 5 to permit the spring 10 to move the valve 7 back to its seat. During such movements of the valve away from and toward its seat, the pin 12 is pressed at its two opposite sides firmly against the parts 2b and 2c of the valve seat member, the forces applied to the two ends of pin 12 having substantial lateral resultant forces because of the cocked or angular position of the pin. The result of this is that the pin 12 is very accurately guided in a predetermined path and, inasmuch as the pin has a strong frictional engagement with the end of the valve 7, said end of the valve is likewise accurately guided in a similar path. Consequently when the valve returns to its seat it necessarily returns in the same position which it previously occupied on the seat. Furthermore, the pin 12, by holding the valve 7 to a predetermined path of movement, effectively prevents a lateral vibration of the valve while it is off its seat. Again, inasmuch as some endwise pressure is constantly maintained on the thrust pin said pin is at all times maintained in firm contact with the guide surfaces of the seat member and the frictional engagement between the thrust pin and the valve opposes slight lateral movements of the valve structure which might result from jar or shock in the handling or transporting of the valve. In this connection it will be understood that the buffer vane 13, interposed between the diaphragm 5 and the adjacent end of the thrust pin, effectively prevents the transmission of any lateral movement of the diaphragm to the thrust pin, such lateral movement of the diaphragm being especially apt to occur during adjustment of spring 14. While the vane 13 flexes during endwise movement of the valve, the latter movement is so slight that there is no appreciable movement of the vane 13, where it engages the end of the pin 12, in a direction transverse to the axis of the pin.

The valve actuating and guiding devices shown and described have further distinctive characteristics but these need not be dwelt upon here since the invention sought herein to be patented is useful in connection with a wide variety of diaphragm-actuated valves. Furthermore, the valve-actuating and guiding mechanism herein disclosed constitutes the subject matter of claims allowed in my copending application Serial No. 39,585, filed September 7, 1935, in which the valve actuating and guiding mechanism is fully disclosed and explained.

The advantage incident to the construction and arrangement of the means for adjusting the tension of the diaphragm spring will be appreciated by those familiar with the fact that the expansion valves of refrigerators are frequently installed in cramped and inaccessible quarters. Such valves have heretofore been provided with rubber caps to prevent access of moisture to the diaphragm mechanism with resultant accumulation of frost and interference with the proper operation of the diaphragm, but the constructions have been such that it was necessary to remove the rubber cap in order to effect any adjustment of the diaphragm spring. Because of the cramped conditions of installation referred to, it has not infrequently happened that the great difficulty of replacing the rubber cap after adjustment of the spring has resulted in the replacement being omitted by workmen not appreciating the importance of preventing access of moisture to the diaphragm mechanism. By means of my improved construction it is possible to readily adjust the tension of the diaphragm spring without removing the rubber cap so that the difficulties mentioned are entirely obviated.

While I have illustrated and described a preferred embodiment of my invention, it should be understood that the invention as herein claimed can be embodied in various other specific forms.

What I claim is:

1. In a valve device, the combination of a valve member; a casing structure for the valve member comprising a movable diaphragm enclosed by other parts of the casing structure and adapted to actuate the valve; a spring within the casing structure for moving the diaphragm; manually operable means extending to the exterior of the casing structure for adjusting the tension of the spring; and a substantially moisture-proof cap covering the exterior part of the manually operable means and the adjacent part of the casing structure, the cap being soft enough to collapse upon the manual means when the latter is grasped so that the manual means can be actuated without removing the cap.

2. In a valve device, the combination of a valve member; a casing structure for the valve member comprising a movable diaphragm enclosed by other parts of the casing structure and adapted to actuate the valve; a spring within the casing structure for moving the diaphragm; manually operable means extending to the exterior of the casing structure for adjusting the tension of the spring, the exterior part of said means being disposed adjacent a cylindrical part of the said casing structure; and a substantially moisture-proof cap covering the exterior part of the manually operable means and the adjacent cylindrical part of the casing structure, the cap having a cylindrical part fitting the cylindrical part of the casing and rotatable thereon and a part soft enough to collapse upon the manually operable means when the latter is grasped by an operator to adjust the spring.

EDWARD M. MAY.